(12) United States Patent
Ma et al.

(10) Patent No.: US 8,358,270 B2
(45) Date of Patent: Jan. 22, 2013

(54) MOUSE WITH WIRE ARRANGEMENT STRUCTURE

(75) Inventors: Mou-Ming Ma, Taipei Hsien (TW);
Yen-Bo Lai, Taipei Hsien (TW); Po-Jen Shih, Taipei Hsien (TW); Shu-I Chen, Taipei Hsien (TW)

(73) Assignee: Giga-Byte Technology Co., Ltd., New Taipei (TW)

( * ) Notice: Subject to any disclaimer, the term of this patent is extended or adjusted under 35 U.S.C. 154(b) by 146 days.

(21) Appl. No.: 13/017,684

(22) Filed: Jan. 31, 2011

(65) Prior Publication Data
US 2012/0194434 A1    Aug. 2, 2012

(51) Int. Cl.
*G06F 3/033* (2006.01)
*G09G 5/08* (2006.01)
*G09G 5/00* (2006.01)

(52) U.S. Cl. ......... 345/163; 345/156; 345/162; 345/166
(58) Field of Classification Search .......... 345/163–166; 242/385
See application file for complete search history.

(56) References Cited

U.S. PATENT DOCUMENTS
6,600,479 B1 *   7/2003   Smith et al. ............... 345/163
8,049,725 B2 *   11/2011  Chang ........................ 345/163

FOREIGN PATENT DOCUMENTS
JP         2000105668 A   *   4/2000

* cited by examiner

*Primary Examiner* — Alexander Eisen
*Assistant Examiner* — Nan-Ying Yang
(74) *Attorney, Agent, or Firm* — Chun-Ming Shih

(57) ABSTRACT

A mouse with a wire arrangement structure is provided. The mouse includes a housing, a base, a connection unit and a wire. The housing includes an opening and an opening edge. The base corresponds to the housing, wherein the base is moved between a first position and a second position, and when the base is in the first position, the base abuts the opening edge to cover the opening, and when the base is in the second position, the base is separated from the opening edge. The connection unit is connected to the housing and the base, allowing the base to move relative to the housing. The wire includes a joint, wherein when the wire is in a receiving state, the wire is wound up around the connection unit.

5 Claims, 6 Drawing Sheets

MOUSE WITH WIRE ARRANGEMENT STRUCTURE

BACKGROUND OF THE INVENTION

1. Field of the Invention

The present invention relates to a wired mouse, and in particular relates to a mouse with a wire arrangement structure.

2. Description of the Related Art

A conventional wired mouse comprises a mouse body and a wire. The wire connects the mouse body to an electronic device (for example, computer) via a joint. Conventionally, when the wired mouse is carried or stored, the wire is wound around the mouse body, and the joint (free end) of the wire is not fixed and easily loosens causing inconvenience to users.

BRIEF SUMMARY OF THE INVENTION

A mouse with a wire arrangement structure is provided. The mouse includes a housing, a base, a connection unit and a wire. The housing includes an opening and an opening edge. The base corresponds to the housing, wherein the base is moved between a first position and a second position, and when the base is in the first position, the base abuts the opening edge to cover the opening, and when the base is in the second position, the base is separated from the opening edge. The connection unit is connected to the housing and the base, allowing the base to move relative to the housing. The wire includes a joint, wherein when the wire is in a receiving state, the wire is wound up around the connection unit.

Utilizing the embodiment of the invention, the wire and the joint are received in a chamber formed by the housing and the base, and the joint (free end) of the wire is prevented from being loosened, and the mouse is easily carried. In a modified example, the wire partially is wound up around the connection pillar to decrease the length of the wire exposed on the outside of the mouse.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1A:
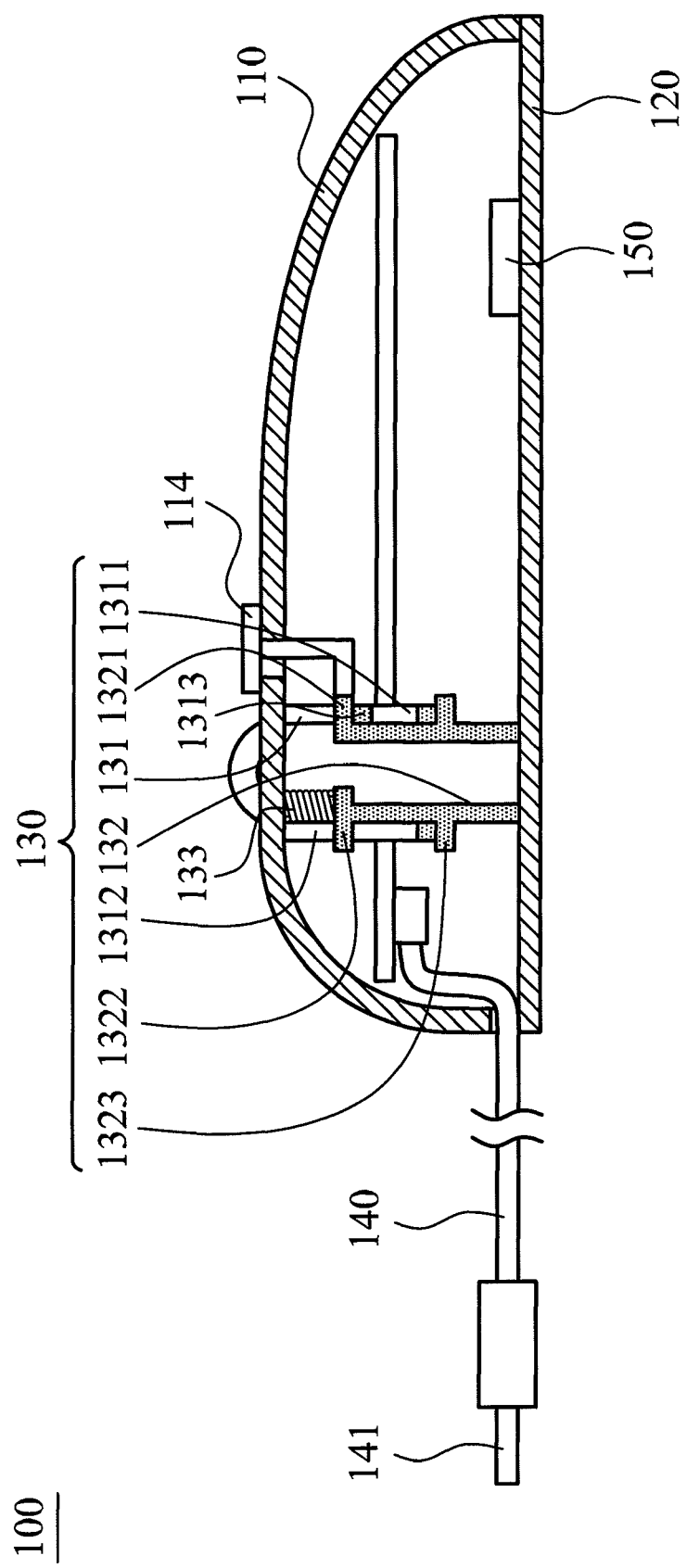
FIG. 1A shows a mouse with a wire arrangement structure of a first embodiment of the invention, wherein a base thereof is in a first position.
Figure 1B:
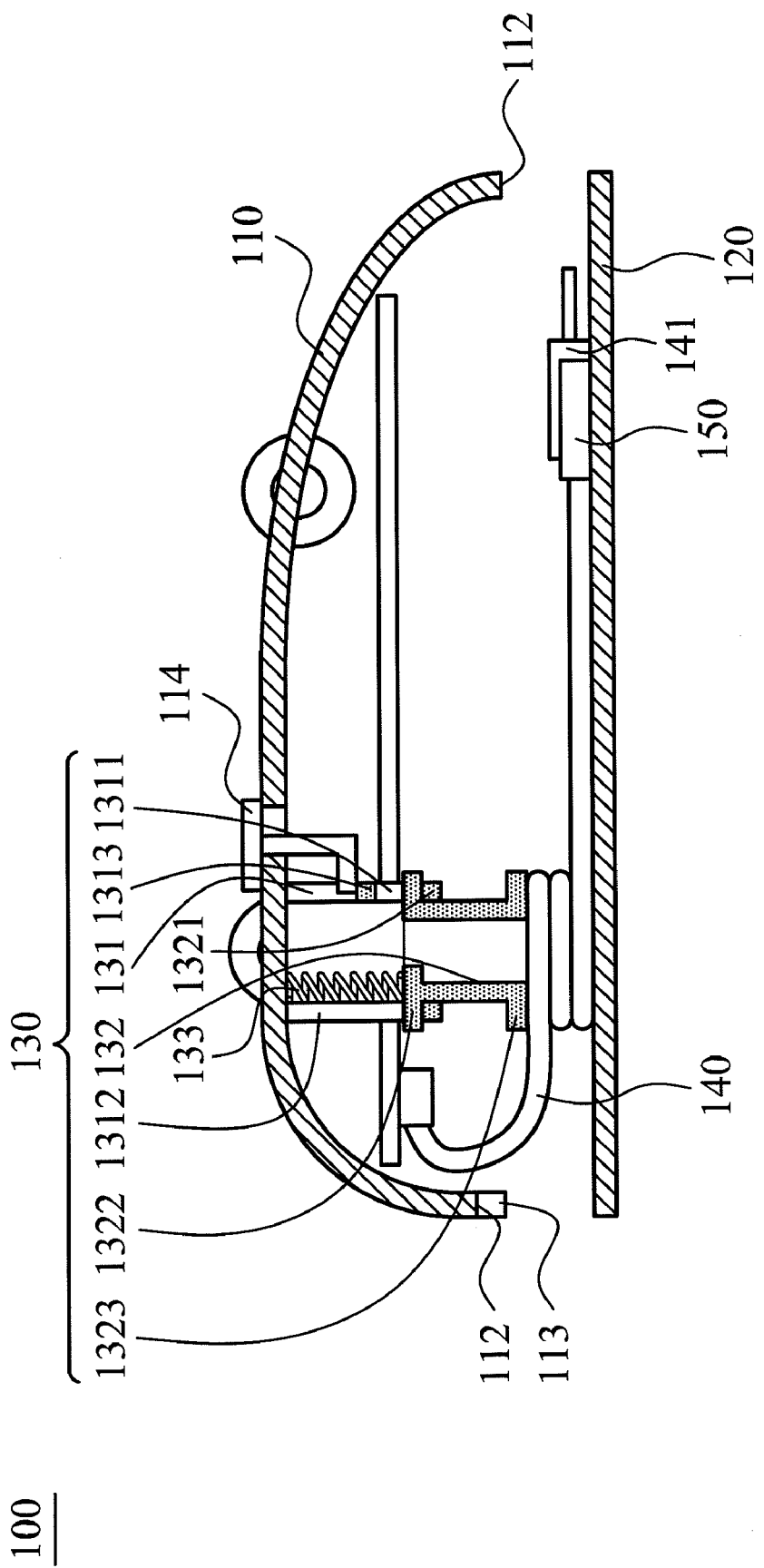
FIG. 1B shows the mouse with a wire arrangement structure of the first embodiment of the invention, wherein the base thereof is in a second position.

FIGS. 1A and 1B show a mouse 100 with a wire arrangement structure of a first embodiment of the invention. The mouse 100 comprises a housing 110, a base 120, a connection unit 130 and a wire 140. The housing 110 comprises an opening 111 and an opening edge 112. The base 120 corresponds to the housing 110, wherein the base 120 is moved between a first position (as shown in FIG. 1A) and a second position (as shown in FIG. 1B). When the base 120 is in the first position, the base 120 abuts the opening edge 112 to cover the opening 111. When the base 120 is in the second position, the base 120 is separated from the opening edge 112 to uncover the opening 111. The connection unit 130 is connected to the housing 110 and the base 120 allowing the base 120 to move relative to the housing 110. The wire 140 comprises a joint 141, wherein when the wire 140 is in a receiving state, the wire 140 is wound up around the connection unit 130.

The connection unit 130 comprises a connection pillar 132 and a connection element 131. The connection pillar 132 is disposed on the base 120. The connection element 131 is disposed on an inner surface of the housing 110. The connection pillar 132 is slidably connected to the connection element 131.

The connection element 131 comprises a first restriction slot 1311, a second restriction slot 1312 and a restriction block 1313. The connection pillar 132 comprises a first arm 1321 and a second arm 1322. The first arm 1321 slides in the first restriction slot 1311. When the base 120 is in the first position, the restriction block 1313 abuts the first arm 1321 to restrict the connection pillar 132. When the base 120 is moved to the second position, the first arm 1321 is deformed and separated from the restriction block 1313 and moved in the first restriction slot 1311. The second arm 1322 is moved in the second restriction slot 1312. When the base 120 is in the second position, the first arm 1321 and the second arm 1322 abut bottoms of the first restriction slot 1311 and the second restriction slot 1312, respectively.

In one embodiment, the mouse 100 further comprises an elastic element 133. The elastic element 133 abuts the housing 110 and the second arm 1322. When the first arm 1321 is pushed and deformed by a pushing element 114, the first arm 1321 is separated from the restriction block 1313, and the elastic element 133 pushes the connection pillar 132 and the base 120 to move toward the second position.

In one embodiment, the connection pillar 132 further comprises a rib 1323. When the wire 140 is in the receiving state, the wire 140 is wound up around the connection pillar 132 between the rib 1323 and the base 120.

The housing 110 further comprises a notch 113 formed on the opening edge 112. When the wire 140 is in a usage state, the wire 140 abuts the notch 113.

The mouse 100 can further comprise a joint fixer 150 disposed on the base 120. When the wire 140 is in the receiving state, the joint 141 is wedged to the joint fixer 150.

Figure 1C:
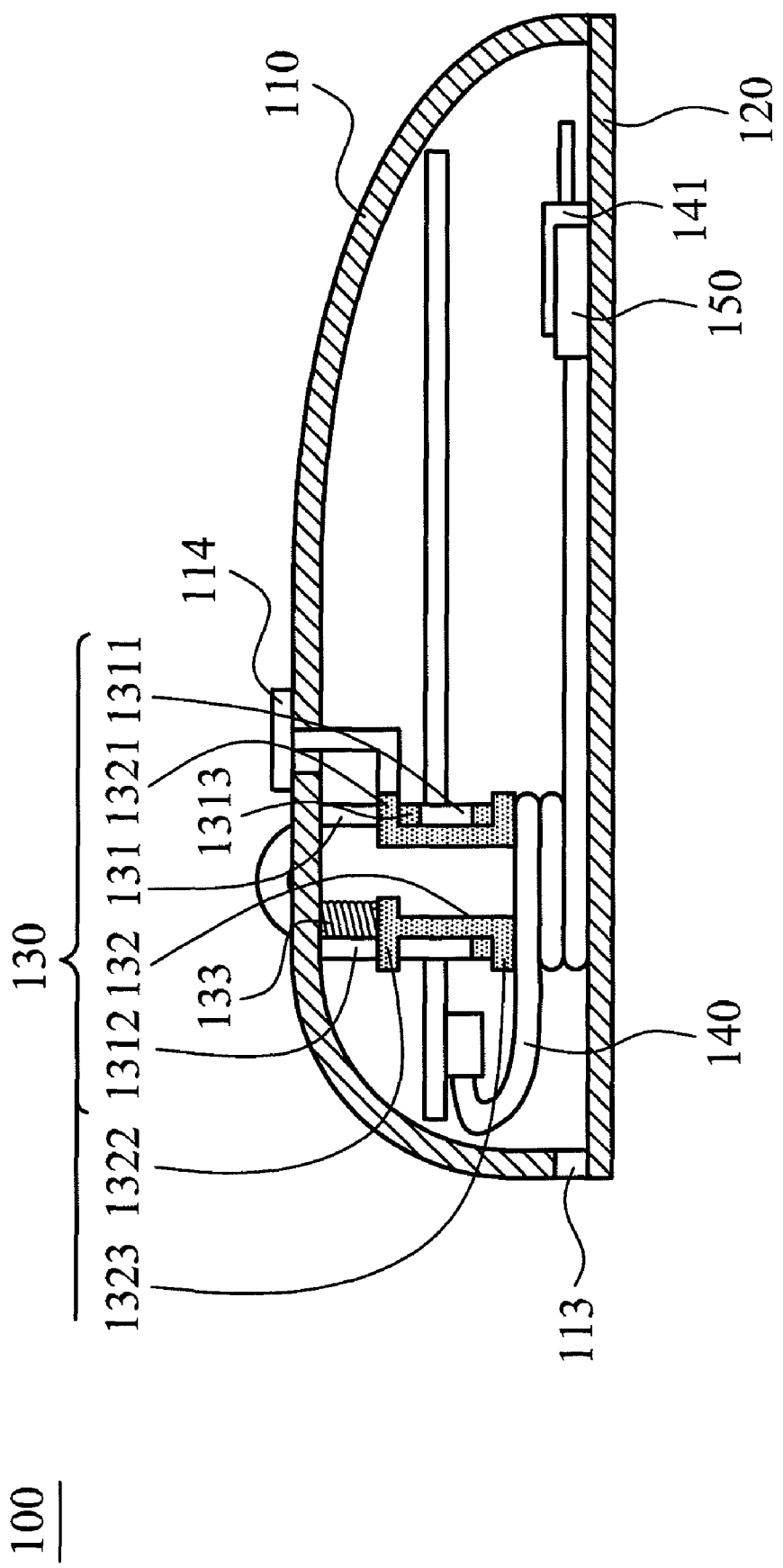
FIG. 1C shows a wire of the mouse of the first embodiment of the invention received in a housing.

FIG. 1C shows the wire 140 received in the housing 110, wherein the base 120 is in the second position. Utilizing the embodiment of the invention, the wire and the joint are received in a chamber formed by the housing 110 and the base 120, and the joint (free end) of the wire is prevented from loosening, and the mouse is easily carried. In a modified example, the wire partially is wound up around the connection pillar 132 to decrease the length of the wire exposed on the outside of the mouse.

Figure 2:
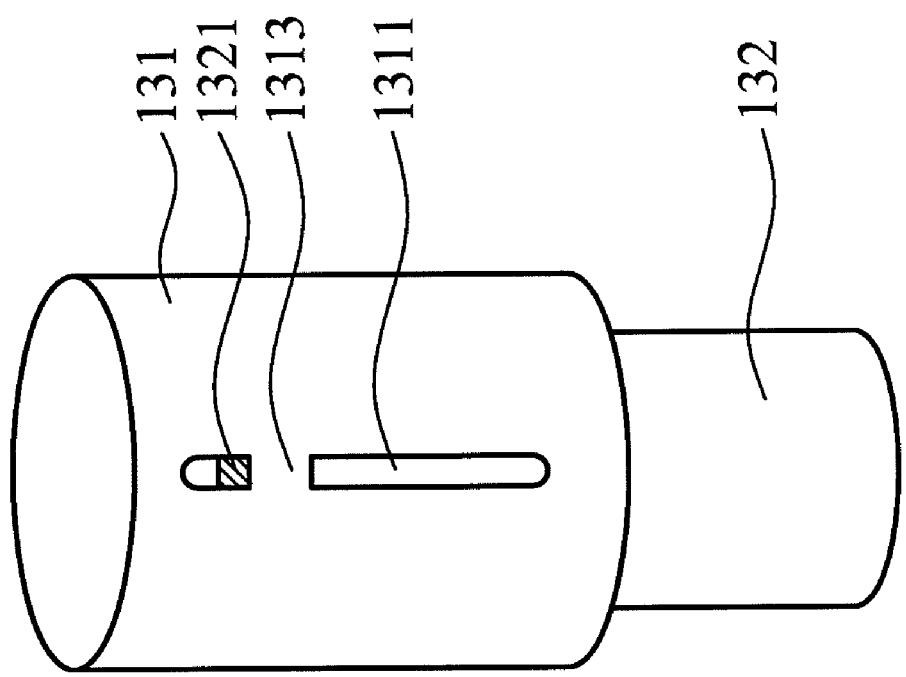
FIG. 2 shows a detailed structure of a first arm, a restriction block and a first restriction slot of the mouse of the first embodiment of the invention.

FIG. 2 shows a detailed structure of the first arm 1321, the restriction block 1313 and the first restriction slot 1311. As shown in FIG. 2, the connection pillar 132 and the connection element 131 are cylindrical.

Figure 3A:
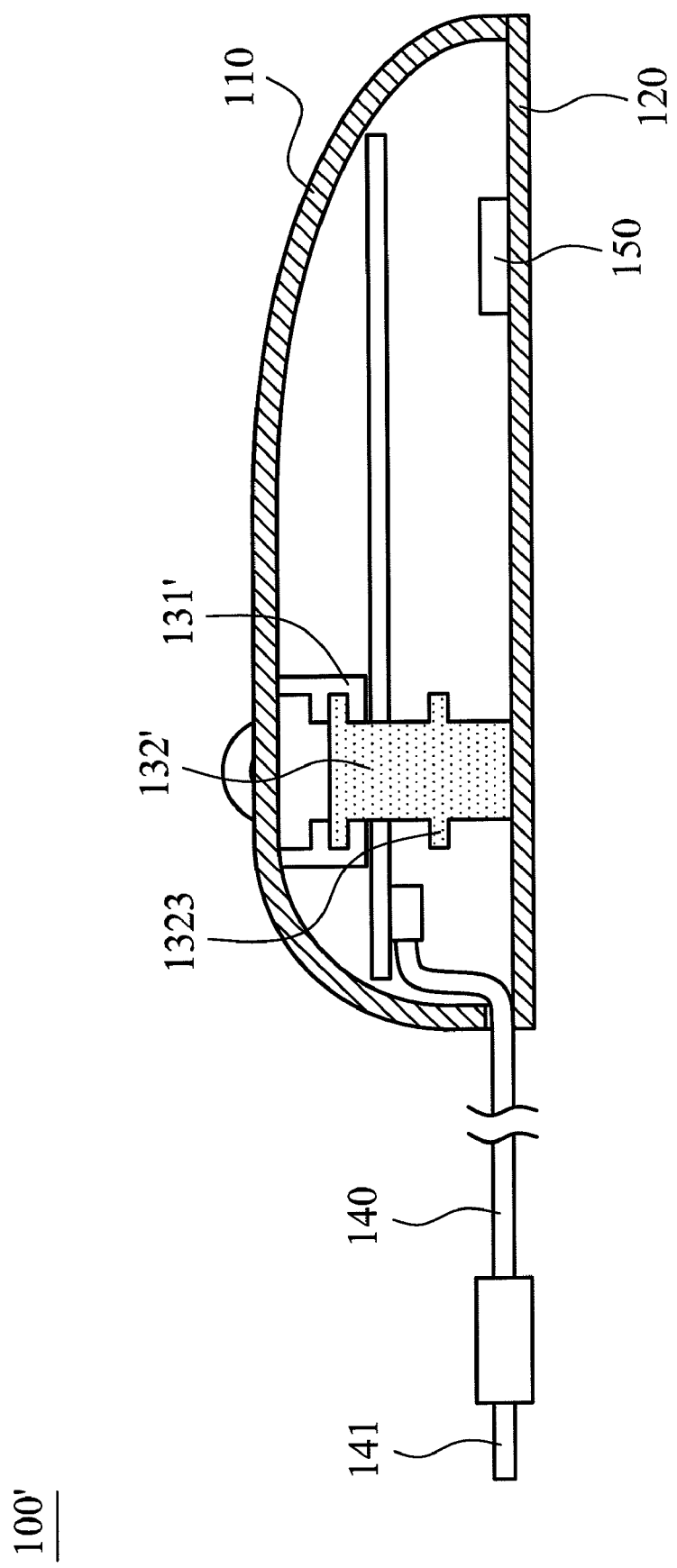
FIG. 3A shows a mouse with a wire arrangement structure of a second embodiment of the invention, wherein a base thereof is in a first position.
Figure 3B:
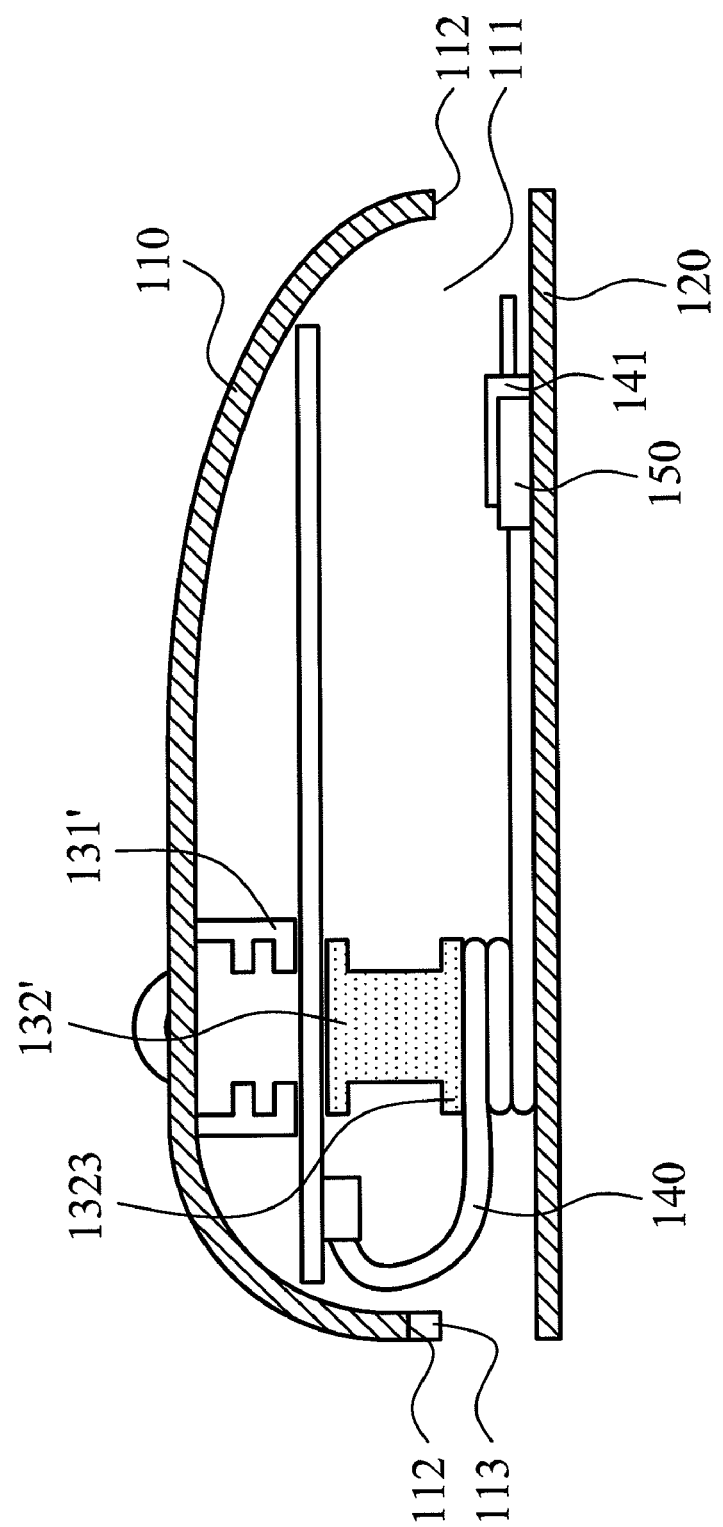
FIG. 3B shows the mouse with a wire arrangement structure of the second embodiment of the invention, wherein the base thereof is in a second position.

FIGS. 3A and 3B show a mouse 100' with a wire arrangement structure of a second embodiment of the invention. The mouse 100 comprises a housing 110, a base 120 and a wire 140. The housing 110 comprises an opening 111, an opening edge 112 and a connection element 131'. The base 120 comprises a connection pillar 132'. The connection pillar 132' is detachably connected to the connection element 131. The base 120 corresponds to the housing 110. When the connection pillar 132' is wedged to the connection element 131', the base 120 abuts the opening edge 112 to cover the opening 111. When the connection pillar 132' is separated from the connection element 131', the base 120 is separated from the opening edge 112 to uncover the opening 111. The wire 140 comprises a joint 141, wherein when the wire 140 is in a receiving state, the wire 140 is wound up around the connection pillar 132'.

Similar to the first embodiment, the connection pillar 132' further comprises a rib 1323. When the wire 140 is in the receiving state, the wire 140 is wound up around the connection pillar 132' between the rib 1323 and the base 120.

The characteristic of the mouse 100' of the second embodiment is that the connection pillar 132' is detachably connected to the connection element 131'. Utilizing the first and second embodiments of the invention, the wire and the joint are received in a chamber formed by the housing 110 and the base 120, and the joint (free end) of the wire is prevented from being loosened, and the mouse is easily carried.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A mouse with a wire arrangement structure, comprising:
   a housing, comprising an opening and an opening edge;
   a base, corresponding to the housing, wherein the base is moved between a first position and a second position, and when the base is in the first position, the base abuts the opening edge to cover the opening, and when the base is in the second position, the base is separated from the opening edge;
   a connection unit, connected to the housing and the base, allowing the base to move relative to the housing, wherein the connection unit comprises a connection pillar and a connection element and the connection pillar is disposed on the base, and the connection element is disposed on an inner surface of the housing, and the connection pillar is slidably connected to the connection element; and
   a wire, comprising a joint, wherein when the wire is in a receiving state, the wire is wound up around the connection unit;
   wherein the mouse further comprising a pushing element, the connection element comprises a first restriction slot, a restriction block and a second restriction slot, and the connection pillar comprises a first arm and a second arm, and the second arm slides in the second restriction slot;
   when the base is in the first position, the restriction block abuts the first arm to restrict the connection pillar, and when the pushing element pushes the first arm, the first arm is deformed and separated from the restriction block and moved in the first restriction slot allowing the base moved toward the second position.

2. The mouse with a wire arrangement structure as claimed in claim 1, further comprising an elastic element, abutting the housing and the second arm.

3. The mouse with a wire arrangement structure as claimed in claim 1, wherein the connection pillar further comprises a rib, and when the wire is in the receiving state, the wire is wound up around the connection pillar between the rib and the base.

4. The mouse with a wire arrangement structure as claimed in claim 1, wherein the housing further comprises a notch formed on the opening edge, and when the wire is in a usage state, the wire abuts the notch.

5. The mouse with a wire arrangement structure as claimed in claim 1, further comprising a joint fixer, disposed on the base, wherein when the wire is in the receiving state, the joint is wedged to the joint fixer.

* * * * *